E. L. CHASE & B. F. MILTON.
EGG BEATER.
APPLICATION FILED AUG. 8, 1908.
936,410. Patented Oct. 12, 1909.
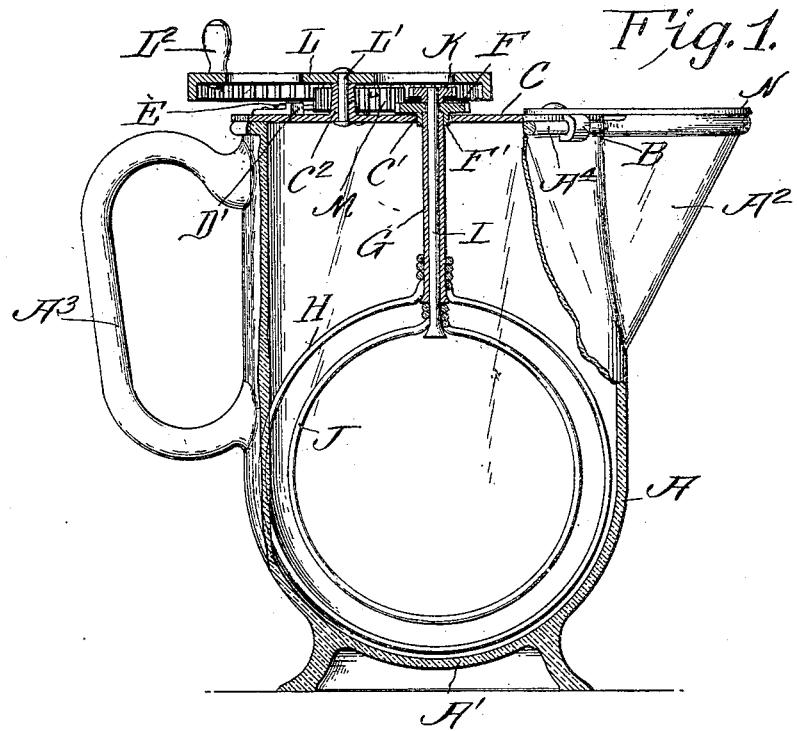
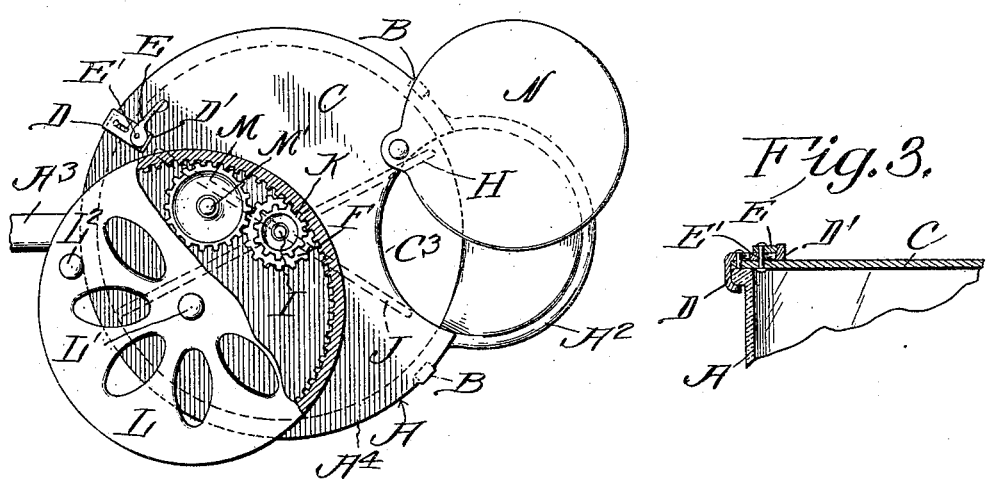
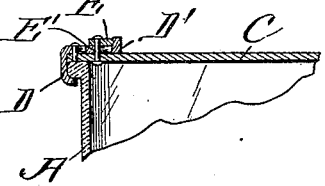
Witnesses
C. E. Smith.
Geo. P. Ebright.
Inventors
E. L. Chase and
B. F. Milton,
By O'Mear... Attorney

UNITED STATES PATENT OFFICE.

ERNEST L. CHASE AND BENJAMIN F. MILTON, OF WEST SOUND, WASHINGTON.

EGG-BEATER.

936,410.

Specification of Letters Patent. Patented Oct. 12, 1909.

Application filed August 8, 1908. Serial No. 447,612.

*To all whom it may concern:*

Be it known that we, ERNEST L. CHASE and BENJAMIN F. MILTON, citizens of the United States, residing at West Sound, in the county of San Juan and State of Washington, have invented a new and useful Improvement in Egg-Beaters, of which the following is a specification.

This invention relates to egg beaters, the object being to provide a pair of concentric beaters in connection with a vessel whereby an egg can be beaten very quickly.

Another object of our invention is to provide novel means for rotating the beaters in different directions whereby the egg will be thoroughly agitated.

Another object of our invention is to provide very novel means for securing the cover carrying the beaters in position on the vessel so that it can be easily and quickly attached or detached to enable the beaters to be readily cleaned.

A further object of the invention is to provide the cover with a swinging lid adapted to close the spout of the vessel so as to prevent the egg from being thrown out of the same.

With these various objects in view, the invention consists in the novel features of construction, combination and arrangement of parts hereinafter fully described and pointed out in the claims.

In the drawing forming a part of this specification:—Figure 1 is a side elevation of our improved egg beater partly in section. Fig. 2 is a top plan view of the same partly broken away to show the position of the gear wheels. Fig. 3 is a detail vertical section showing the manner of securing the cover on the vessel.

In carrying out our invention, we employ a vessel A preferably formed of glass having a concaved bottom A' provided with a spout $A^2$ and a handle $A^3$. The upper edge of the vessel is formed with a flange $A^4$ over which is adapted to fit hook members B carried by a cover C which is provided with a slidably mounted hook member D having an angled end D' adapted to be operated by a cam lever E pivotally mounted on a pin E' in the cover whereby the cover can be securely locked on the vessel without any danger of it moving.

An opening C' is formed centrally in the cover through which extends a sleeve F' of a gear F to which is connected a hollow shaft G having a ring shaped beater H secured to its lower end, the lower portion of which is concentric to the concaved bottom A' of the vessel so that the egg within the same will be thoroughly agitated when the same is rotated as will be hereinafter fully described.

Extending through the hollow shaft G is a shaft I having a ring shaped beater J secured on its lower end concentric with the beater H. The upper end of the shaft I has a gear K secured thereon adapted to mesh with an internally toothed power gear wheel L which is pivotally mounted on a bolt L' extending vertically through a boss $C^2$ formed on the cover to one side of the center. The gear L is provided with a handle $L^2$ for operating the same. Mounted on a shaft M' secured in the cover C is a gear wheel M which meshes with the internally toothed gear wheel L and with the gear wheel F and it will be seen that when the gear L is rotated the gears K and F will be rotated in different directions causing the beaters H and J to revolve in different directions. The cover C is cut away opposite the spout as shown at $C^3$ and pivotally connected to the cover is a lid N for closing the spout and the cut away portion of the cover which enables an egg to be readily placed within the vessel and the contents of the same to be poured out when desired.

From the foregoing description, it will be seen that we have provided an egg beater, the receptacle of which is preferably formed of glass so that the operator can watch the contents of the vessel as it is being agitated without removing the cover.

What we claim is:—

1. In an egg beater of the kind described, the combination with a vessel and provided with a concaved bottom, and having a spout, of a cover for closing said vessel provided with a lid for closing said spout, a hollow shaft carried by said cover, a ring shaped beater secured on the lower end of said hollow shaft, a solid shaft mounted within said hollow shaft, a ring shaped beater secured on the lower end of said solid shaft concentric with the first mentioned beater, gears secured on the upper end of the respective shafts, a gear mounted upon the cover meshing with the gear of the hollow shaft and an internally toothed gear mounted upon the cover meshing with the gear of the solid shaft, and a gear mounted upon the cover, for the purpose described.

2. In an egg beater, the combination with a vessel provided with a concaved bottom, of a cover arranged over said vessel provided with sliding hooks, eccentrics for operating said hooks, a hollow shaft mounted in the cover carrying a ring-shaped beater and provided with a gear at its upper end, a shaft mounted within said hollow shaft provided with a ring-shaped beater concentric with the first mentioned beater and provided with a gear at its upper end, and means for operating said beaters through the medium of gears whereby said beaters will rotate in opposite directions.

ERNEST L. CHASE.
BENJAMIN F. MILTON.

Witnesses:
 GENE C. GOULD,
 C. M. TUCKER.